(12) United States Patent
Krogull et al.

(10) Patent No.: US 7,185,638 B2
(45) Date of Patent: Mar. 6, 2007

(54) FUEL TANK FOR A MOTOR VEHICLE

(75) Inventors: Christian Krogull, Gelsenkirchen (DE); Frank Reiter, Haan Rheinl (DE)

(73) Assignee: Siemens Aktiengessellschaft, Munich (DE)

( * ) Notice: Subject to any disclaimer, the term of this patent is extended or adjusted under 35 U.S.C. 154(b) by 324 days.

(21) Appl. No.: 10/909,525

(22) Filed: Aug. 2, 2004

(65) Prior Publication Data
US 2005/0039728 A1 Feb. 24, 2005

(30) Foreign Application Priority Data
Aug. 4, 2003 (DE) ................. 103 35 626

(51) Int. Cl.
*F02M 37/04* (2006.01)
(52) U.S. Cl. ..................... 123/509; 123/516
(58) Field of Classification Search ............... 123/509, 123/510, 516, 518
See application file for complete search history.

(56) References Cited

U.S. PATENT DOCUMENTS 4,099,645 A * 7/1978 Muth et al. ................. 220/304
4,807,472 A * 2/1989 Brown et al. ................. 73/313
6,182,693 B1 2/2001 Stack et al.

FOREIGN PATENT DOCUMENTS

| DE | 91 11 920.0 | 1/1992 |
|---|---|---|
| DE | 100 63 414 A1 | 6/2002 |
| DE | 102 01 652 A1 | 8/2002 |
| WO | WO 01/21991 A1 | 3/2002 |
| WO | WO 02/26514 A2 | 4/2002 |

\* cited by examiner

Primary Examiner—Thomas Moulis
(74) Attorney, Agent, or Firm—Richard A. Speer; Mayer, Brown, Rowe & Maw LLP

(57) ABSTRACT

In a fuel tank (1), a condensate collector (13) of a venting line (12) with a closure lid (6) forms one structural unit. The closure lid (6) closes off an opening (7) in a wall (8) in the fuel tank (1). The condensate collector (13) has spring elements (17) for prestressing elastic venting lines (15) against the inside of the fuel tank (1) and the venting device (12) can be mounted through the opening (7) in the fuel tank (1).

9 Claims, 2 Drawing Sheets

FUEL TANK FOR A MOTOR VEHICLE

BACKGROUND OF THE INVENTION

The invention relates to a fuel tank construction for a motor vehicle having a fuel containing chamber or volume which is defined by a wall. A chamber venting device is provided which has a condensate collector supported by the wall. Venting lines are connected to the condensate collector and led into the region of the tank which is located above the fuel. A closure lid which is integrated with the condensate collector, which closes an access opening in the wall of the tank.

Contemporary fuel tanks are usually fabricated from plastic using an injection molding or blowing method and are known from practice. Condensate collectors are used to precipitate fuel from fuel vapors present in the tank chamber above the liquid fuel and are usually vented to the atmosphere via an activated carbon filter. Pressure compensation of the chamber is effected by means of the activated carbon filter when the fuel tank is refilled or when the temperature changes. The condensate collector and the venting lines are attached to the inside of the wall of the fuel tank. A disadvantage with the known fuel tank is that the means of attaching the condensate collector and the venting lines are very complex. In addition, attachment elements which are complicated to manufacture are necessary on the inside of the fuel tank, the condensate collector and the venting lines being mounted on said elements.

The invention is based on the problem of designing a fuel tank of the type mentioned at the beginning in such a way that it can be manufactured in a particularly cost-effective way.

BRIEF DESCRIPTION OF THE INVENTION

A solution to this problem is achieved according to the invention in that the condensate collector and the closure lid which seals an access opening into the interior of the tank are formed as an integrated or single structural unit.

As a result of this design, the condensate collector can be manufactured with the closure lid as one structural unit and can be mounted on the wall of the tank chamber without using further attachment elements. This leads to a simplification of the fabrication costs of the fuel tank according to the invention. A further advantage of this design is that the condensate collector is accessible for repairs. This is advantageous since contemporary condensate collectors frequently contain various components, such as valves, pumps or cooling devices. These components can be serviced after the closure lid has been removed.

In order to reduce the assembly work for the condensate collector further, it is beneficial if a line which leads to the atmosphere, in order to compensate the pressure in the chamber, penetrates the closure lid. Such lines generally connect the chamber to the atmosphere via an active carbon filter and thus permit air to flow into the chamber and out of it when the temperature of the fuel changes or when refueling is carried out.

A fuel tank according to the invention is of particularly compact design if the condensate collector is arranged on the side of the closure lid facing the chamber. By virtue of this configuration, the condensate collector is arranged on the inside of the fuel tank.

A fuel tank according to the invention wherein structure is provided to create an access opening only at the time a repair is necessary is of particularly simple construction. This construction contemplates that the closure lid be fabricated in one piece with the wall. In the case of a repair, the closure lid is separated from the wall and a new closure lid is reconnected to the wall after the repair. This keeps emissions of fuel particularly low, at least before the repair.

The structural unit composed of the condensate collector and closure lid is of particularly compact design according to another advantageous development if the condensate collector is fabricated in one piece with the closure lid. The compact design of the structural unit composed of the condensate collector and closure lid also gives rise to a particularly large usable volume within the tank chamber.

In order to simplify the assembly of the condensate collector further, it is beneficial, according to another advantageous development of the invention, to provide a flange on the condensate collector, for attaching to the wall, and providing a seal between the condensate collector and the wall.

According to another advantageous development of the invention, the condensate collector and closure lid can easily be assembled for the anticipated application by connection of the condensate collector to the closure lid with a screw thread or a bayonet closure.

According to another advantageous development of the invention, the condensate collector which is arranged on the inside of the closure lid can be mounted particularly easily in the chamber if it has smaller dimensions than the opening in the tank wall which is sealed by the closure lid.

According to another advantageous development of the invention, venting lines with particularly large dimensions can easily be mounted through the access opening which is sealed by the closure lid, if the venting lines are of elastic design. This contributes to further simplifying the mounting of the venting device in the fuel tank according to the invention. In this context, the venting lines can, for example, be bent or folded during mounting and unfolded inside the chamber. Using the elastic venting lines also makes it possible for the condensate collector to be subsequently mounted and dismounted with the venting lines in single-component fuel tanks through the tank access opening which can be sealed by the closure lid.

According to another advantageous development of the invention, the venting lines can be fabricated in a particularly cost-effective way from plastic using a plastic injection method if the venting lines have at least one section made of corrugated tubing.

According to another advantageous development of the invention, the positioning of the venting lines involves a particularly small amount of effort if the venting lines are prestressed into an anticipated position.

According to another advantageous development of the invention, the prestressing of the venting lines into the anticipated position involves a particularly small amount of structural complexity if spring elements are attached to the condensate collector and if the spring elements are connected to the free ends of the venting lines.

BRIEF DESCRIPTION OF THE DRAWINGS

The invention permits numerous embodiments. In order to clarify its basic principle, two of these are illustrated in the drawings and will be described below. In the drawings.

DETAILED DESCRIPTION OF THE INVENTION

Figure 1:
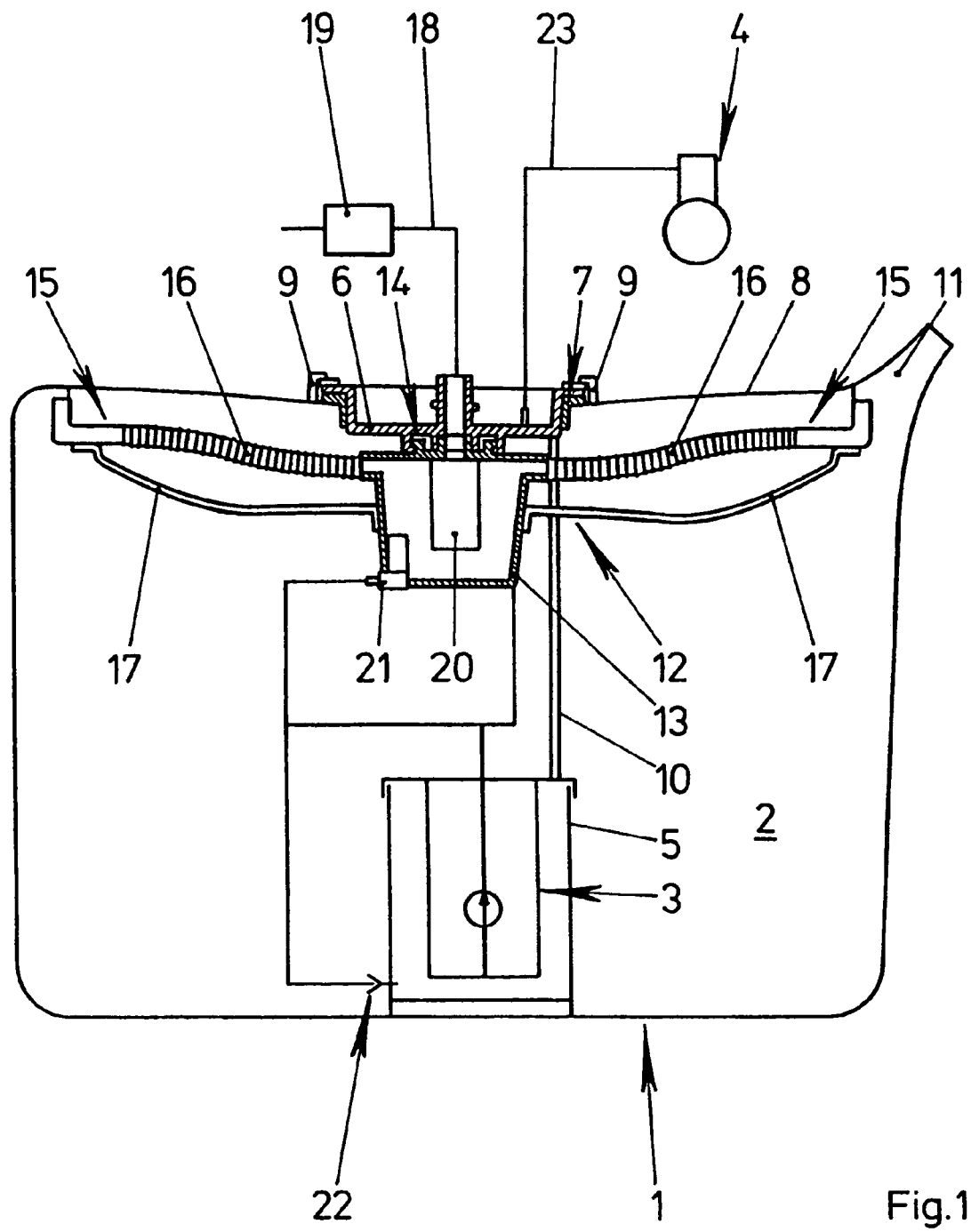
FIG. 1 is a schematic, sectional view through a fuel tank constructed according to the invention.

FIG. 1 is a schematic, sectional view through a fuel tank 1 with a tank chamber or volume 2 for holding fuel and a feed unit 3, arranged therein. Feed unit 3, which includes a fuel pump, feeds the fuel to an internal combustion engine 4 of a motor vehicle. The feed unit 3 is arranged in a surge chamber 5 underneath a closure lid 6 which seals an access opening 7 formed in wall 8 of the fuel tank 1. Closure lid 6 is prestressed in a seal-forming fashion against the wall 8 by stressing elements 9. A mounting element 10 extends between the underside of closure lid 6 and the feed unit 3 to bias the unit 3 against the base of the lowermost part of wall 8 which defines chamber 2. The fuel tank 1 also has a filling connector 11. There is a venting device 12 which comprises a condensate collector 13 that is joined to the closure lid 6, to form an integrated unit. The means of attaching the condensate collector 13 to the closure lid 6 includes a bayonet closure 14. Venting lines 15 lead into outer upper regions of the chamber 2 from the condensate collector 13. The venting lines 15 each have an elastic section made of corrugated tubing 16 and are biased at their external ends against the upper region of the wall 8 of the fuel tank 1 by means of spring elements 17 which are connected to the condensate collector 13.

The condensate collector 13 is interconnected to an activated carbon filter 19 by means of a line 18 which is led through the closure lid 6 and into the interior of condensate collector 13. The activated carbon filter 19 permits pressure compensation of the condensate collector 13 with the atmosphere. A valve 20 is arranged inside the condensate collector 13 upstream of the line 18 which leads to the activated carbon filter 19. Valve 20 closes the line 18, for example in extreme travel situations with the motor vehicle or when it rolls over, thus preventing fuel from being able to escape from the fuel tank 1.

The feed unit 3 feeds fuel to a first extraction jet pump 21 which is located in the bottom region of the condensate collector 13, to a second extraction jet pump 22 which is located in the bottom region of the surge chamber 5, and to the internal combustion engine 4, via a forward feed line 23 which is led through the closure lid 6. The sucking jet pump 21 which is situated in the bottom region of the condensate collector 13 makes it possible to withdraw fuel which has been deposited in the condensate collector 13 and feed it to the chamber 2. The surge chamber 5 is filled with fuel from the chamber 2 by means of the extraction jet pump 22 which is located in the bottom region of the surge chamber 5.

The surge chamber 5 and the condensate collector 13 each have a smaller cross section than that of the opening 7 of the wall 8. As a result, the condensate collector 13 and the surge chamber 5 with the feed unit 3 which is arranged therein can be inserted through the opening 7 in the wall 8 of the fuel tank 1.

Figure 2:
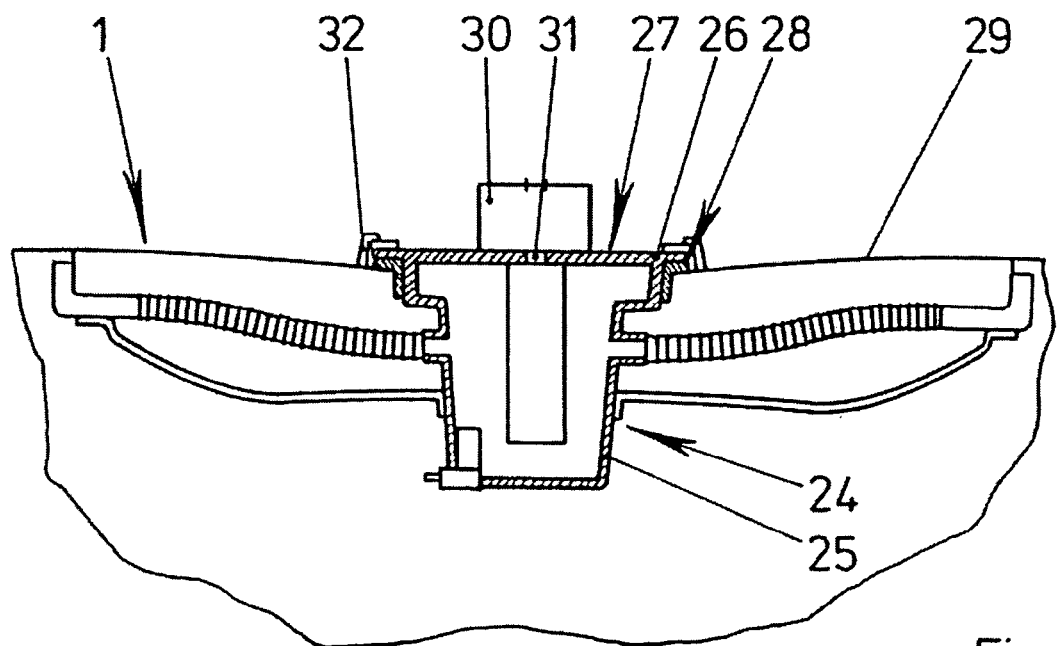
FIG. 2 is a schematic, partially sectional view through a further embodiment of the fuel tank constructed according to the invention.

FIG. 2 shows a partial section through a further embodiment of the fuel tank, in which a venting device 24 with a condensate collector 25 has a circumferential flange 26 as a closure lid 27 for an opening 28 in a wall 29 of the fuel tank 1. As a result, the closure lid 27 and condensate collector 25 are fabricated in one piece. An activated carbon filter 30 is attached directly to the upper side of the condensate collector 25 in a seal-forming fashion and covers an opening 31. The flange 26 of the condensate collector 25 is prestressed against the wall 29 in a seal-forming fashion by means of stressing elements 32. Otherwise, the venting device 24 has the same design as the one shown in FIG. 1. Furthermore, FIG. 2 shows that the closure lid 27 does not have any further securing means, for example for the feed unit 3 which is illustrated in FIG. 1.

Figure 3:
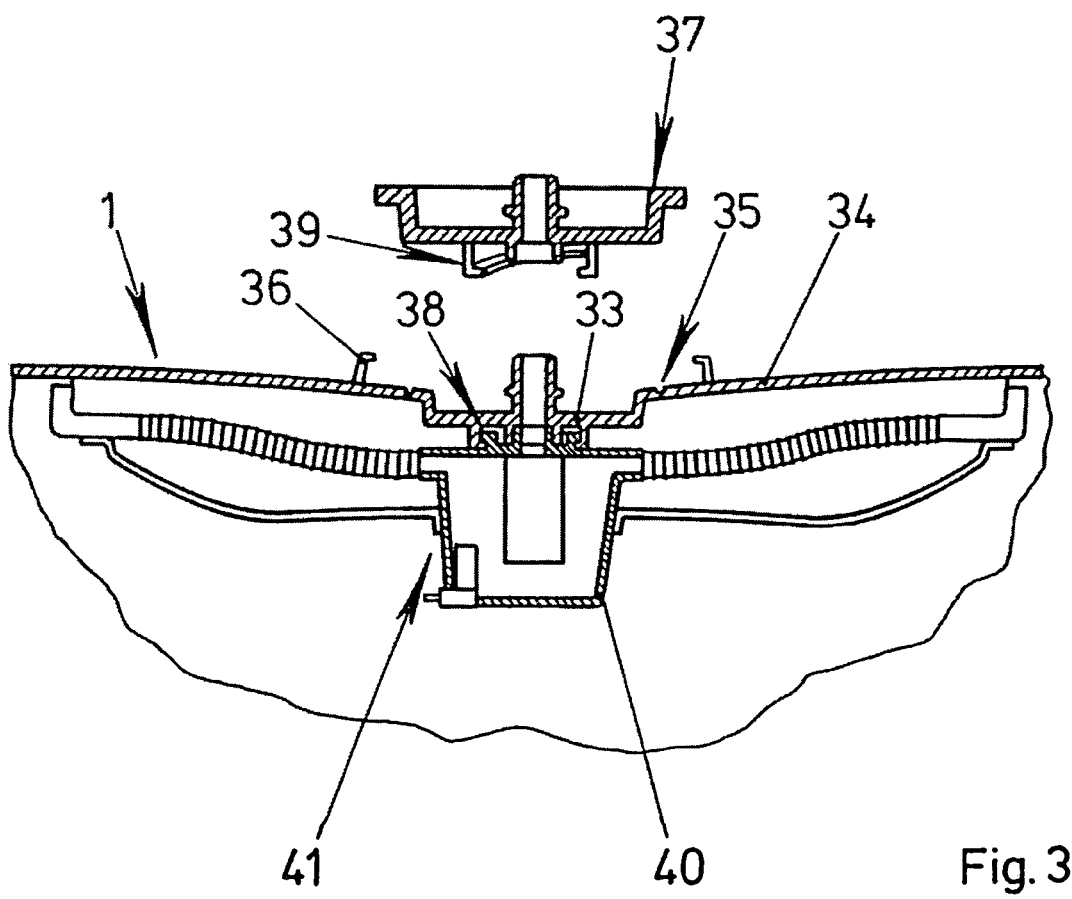
FIG. 3 is a schematic, partially sectional view through a further embodiment of the fuel tank constructed according to the invention.

FIG. 3 shows a partial section through a further embodiment of the fuel tank 1 in which a first closure lid 33 is fabricated in one piece with a wall 34 of the fuel tank 1. The closure lid 33 has a cutting edge 35 of reduced cross-sectional thickness. When repair is required, the closure lid 33 can be cut out along the cutting edge 35, thus producing an opening in the wall 34. After the cutting out process, the opening is closed off again by means of a second closure lid 37 which can be connected to the wall 34 by means of stressing elements 36. Both closure lids 33, 37 have a screw thread 38, 39 for connecting to a condensate collector 40 of a venting device 41. In the case of a repair, the condensate collector 40 can be removed from the fuel tank 1 after the first closure lid 33 has been cut out, and said condensate collector 40 can be inserted again through the opening which is produced, after connection to the second closure lid 37. In this embodiment also, no securing means are arranged for the feed unit 3 (illustrated in FIG. 1) on the closure lids 33, 37. The venting device 41 otherwise has the same design as in FIG. 1.

The invention claimed is:

1. A fuel tank for a motor vehicle comprising:
   (a) A wall defining an enclosed chamber to hold liquid fuel and fuel vapors;
   (b) an area in the wall that defines an access opening into the enclosed chamber above the liquid fuel where the fuel vapors are present;
   (c) a closure lid for sealing the access opening;
   (d) a condensate collector forming together with the closure lid a single structural unit, the Condensate collector being located within the chamber;
   (e) flexible vent lines having one end connected to the collector and communicating into the interior thereof, the vent lines having openings located in the chamber at a preselected distance from the collector; and
   (f) spring elements connected to the condensate collector at one end and extending outwardly therefrom to support and urge the vent lines upwardly toward the chamber wall.

2. A fuel tank as defined in claim 1, wherein a vent line extends through the closure lid to permit pressure compensation between the chamber and the atmosphere.

3. A fuel tank as defined in claim 1 wherein the closure lid is fabricated in one piece with the wall defining the chamber.

4. A fuel tank as defined in claim 1 or 3 wherein the condensate collector is fabricated in one piece with the closure lid.

5. A fuel tank as defined in claim 1 wherein the condensate collector has a flange for a sealing attachment to the tank wall.

6. A fuel tank as defined in claim 1 wherein the condensate collector is joined to the closure lid by a screw thread or a bayonet closure, whereby a single structural unit is formed.

7. A fuel tank as defined in claim 1 wherein the condensate collector has smaller dimensions than the access opening in the tank wall.

8. A fuel tank as defined in claim 1 wherein the venting lines are prestressed into a preselected position.

9. A fuel tank as defined in claim 1 wherein spring elements are attached to the condensate collector and to the free ends of the venting lines to hold them in the preselected position.

* * * * *